United States Patent [19]

Matsuo et al.

[11] Patent Number: 5,033,300
[45] Date of Patent: Jul. 23, 1991

[54] DEVICE FOR MEASURING DISPLACEMENT

[75] Inventors: Kenji Matsuo; Akira Kumada, both of Kanagawa, Japan; Michihiro Murata, Kyoto, all of Japan

[73] Assignee: Murata Mfg., Co., Ltd., Kyoto, Japan

[21] Appl. No.: 537,174

[22] Filed: Jun. 13, 1990

[30] Foreign Application Priority Data

Jun. 20, 1989 [JP] Japan ................... 1-159306

[51] Int. Cl.[5] ........................................... G01F 23/00
[52] U.S. Cl. ..................... 73/304 R; 73/290 R; 377/17
[58] Field of Search ................. 73/304 R, 290 R, 301, 73/313, 304 C; 324/149, 453; 377/17, 19, 21, 45; 364/550, 561, 562; 356/21, 28, 358, 375; 33/706, 707, 708

[56] References Cited

U.S. PATENT DOCUMENTS

| 3,552,209 | 2/1971 | Johnston | 73/304 R |
| 4,283,719 | 8/1981 | William et al. | 73/304 R |
| 4,284,951 | 8/1981 | Dahl et al. | 73/304 R |
| 4,554,831 | 11/1985 | Sealey et al. | 73/304 R |
| 4,628,302 | 12/1986 | Barr et al. | 73/304 R |
| 4,646,569 | 3/1987 | Cosser | 73/304 R |
| 4,698,828 | 10/1987 | Hiramoto | 377/17 |
| 4,799,047 | 2/1989 | Saitoh | 73/304 R |

Primary Examiner—William A. Cuchlinski, Jr.
Assistant Examiner—Vinh Nguyen
Attorney, Agent, or Firm—Jordan and Hamburg

[57] ABSTRACT

A device for measuring displacement comprises a pair of sensor elements of which output voltage changes stepwise in dependency upon displacement of a measurement object, a differentiating circuit for detecting time points at which the output voltage of the pair of sensor elements suddenly changes, and a counter for counting the sudden change time points of the output voltage detected by the differentiating curcuit.

2 Claims, 2 Drawing Sheets

DEVICE FOR MEASURING DISPLACEMENT

BACKGROUND OF THE INVENTION

1. Field of the Invention

This invention relates to a device for measuring displacement, and more particularly to a device which is useful as a level sensor.

2. Description of the Prior Art

A conventional level sensor is known, for monitoring increases in a conductive liquid delivered into a tank.

Namely, a pair of sensor elements each comprised of electrode portions and resistor portions formed one after another are provided within the tank, wherein the electrode portions are adapted so that they can come into an electrical contact with a liquid whose liquid level changes, and the resistor portions are coated on their surfaces with an insulating material so that they do not come into an electrical contact with the liquid.

A power supply voltage is applied to one sensor element. Further, the other sensor element is connected to a buffer amplifier and is grounded through a resistor from the junction of the other sensor element and the buffer amplifier.

In the level sensor thus constructed, an input voltage of the buffer amplifier rises stepwise with rising of the liquid level.

An output voltage of the buffer amplifier is inputted to a large number of comparators connected in parallel and is compared with reference voltages at the respective comparators.

The reference voltages of the comparators are set so that they have potentials slightly lower than the step potentials of the output voltage of the buffer amplifier, respectively.

Thus, as the level of the liquid rises, outputs of respective comparators shift to "H" level in order from the comparator having the lowest reference voltage to comparators having higher reference voltages.

Outputs from respective comparators are inputted to a priority encoder, at which they are converted to binary codes, respectively.

An output from the priority encoder is inputted to, e.g., a display or a microcomputer, etc.

Thus, the increases in a conductive liquid delivered to the tank is monitored.

The characteristics of the sensor elements are deteriorated because of contact with the liquid, and it is therefore necessary to often exchange them.

Since the resistor portions of the sensor element have unevenness, however, the characteristic is changed upon replacement of the sensor element. Namely, when a sensor element is exchanged, the characteristic of the output voltage of the buffer amplifier does not necessarily show a step potential slightly higher than the reference voltage of each comparator.

Thus, it is inconvenient to use the previous reference voltages as they are, so new reference voltages must be set, resulting in the problem that such a setting is troublesome.

SUMMARY OF THE INVENTION

Therefore, an object of this invention is to provide a device for measuring displacement constructed so that no error is produced even if there is unevenness in the characteristic of the sensor element.

This invention provides a device for measuring displacement, comprising displacement sensor means of which output voltage changes stepwise in dependency upon a displacement of a measurement object, differentiating means for detecting time points at which the output voltage suddenly changes, and counter means for counting the sudden change time points of the output voltage detected by the differentiating means.

In accordance with the device for measuring displacement according to this invention, the sudden change time points of the output voltage of the displacement sensor means is detected by the differentiating means and is counted by the counter means, and displacement is measured by the counted value.

Accordingly, even if the output voltage of the displacement sensor means becomes uneven by unevenness thereof, no influence is exerted on measured results, giving no error.

DESCRIPTION OF THE PREFERRED EMBODIMENTS

This invention will be described in more detail in accordance with the embodiments shown hereinafter. It is to be noted that this invention is not limited by these embodiments.

Figure 1:
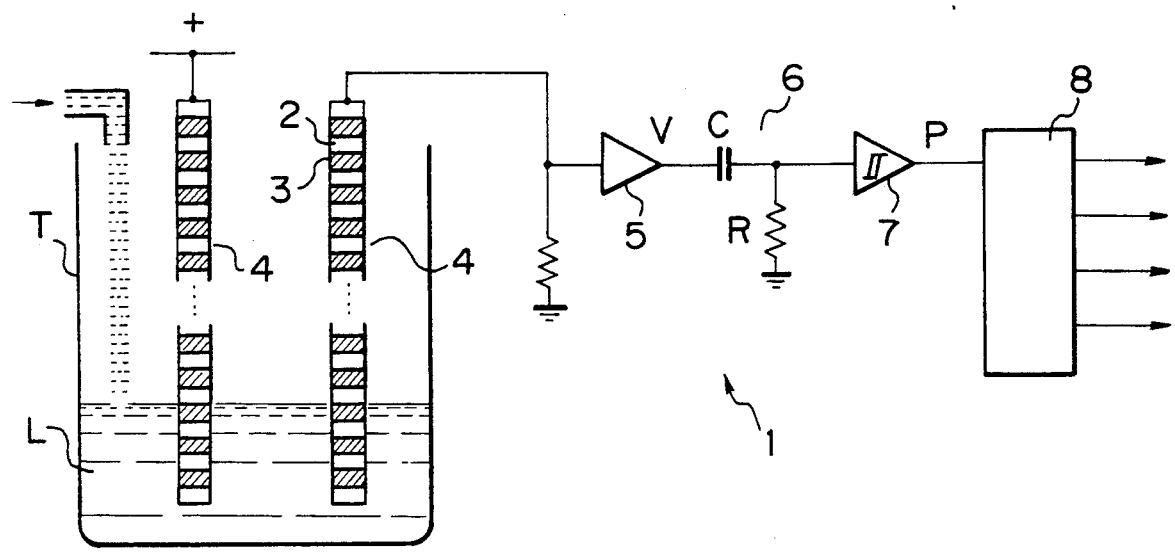
FIG. 1 is an explanatory view showing the configuration of a level sensor which is an embodiment of a device for measuring displacement according to this invention.

Referring to FIG. 1, there is shown a level sensor 1 which is an embodiment of a device for measuring displacement according to this invention.

In the same manner as in the conventional level sensor, this level sensor 1 serves to monitor increases in a conductive liquid L within a tank T.

A pair of sensor elements 4 each comprised of electrode portions 2 and resistor portions 3 formed one after another are provided within the tank T. Such construction is the same as that of the conventional level sensor.

Further, a buffer amplifier 5 has also the same configuration as that of the conventional buffer amplifier.

An output voltage V of the buffer amplifier 5 is applied to a differentiating circuit 6 comprised of a capacitor C and a resistor R.

An output from the differentiating circuit 6 is applied to a binary counter 8 through a Schmitt trigger circuit 7.

In the above construction, when the level of the liquid L rises, so that the output voltage V of the buffer amplifier 5 rises stepwise, an output signal P of the Schmitt trigger circuit 7 takes a form of pulse at each time point when the step varies.

The counter 8 counts the number of pulses delivered thereto. Respective counted values are outputted in the form of binary codes.

Figure 2A:
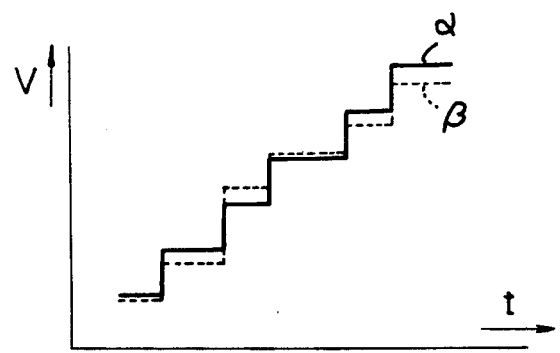
FIG. 2(a) is a characteristic diagram showing an output voltage V of the buffer amplifier shown in FIG. 1.

As shown in FIG. 2(a), it is assumed that the characteristic changes when a sensor element 4 is exchanged because of unevenness of the sensor element 4, so that output voltage V of the buffer amplifier 5 changes from α indicated by the solid line to β indicated by the dotted line.

Figure 2B:
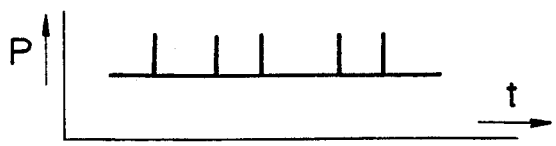
FIG. 2(b) is a characteristic diagram showing an output signal P of the Schmitt trigger circuit shown in FIG. 1.

As shown in FIG. 2(b), since the output signal P of the Schmitt trigger circuit 7 becomes the same signal even in the case of the characteristic α or in the case of the characteristic β, any change is not produced in a measured result obtained as an output of the counter 8.

Namely, any error due to unevenness of the sensor element 4 is not produced.

As described above, since this level sensor 1 is constructed to measure displacement by changes in an output voltage of the sensor element, no error is produced even if there is unevenness of the characteristic of the sensor element. For this reason, even if the sensor element 4 is exchanged, any adjustment becomes unnecessary.

Figure 3:
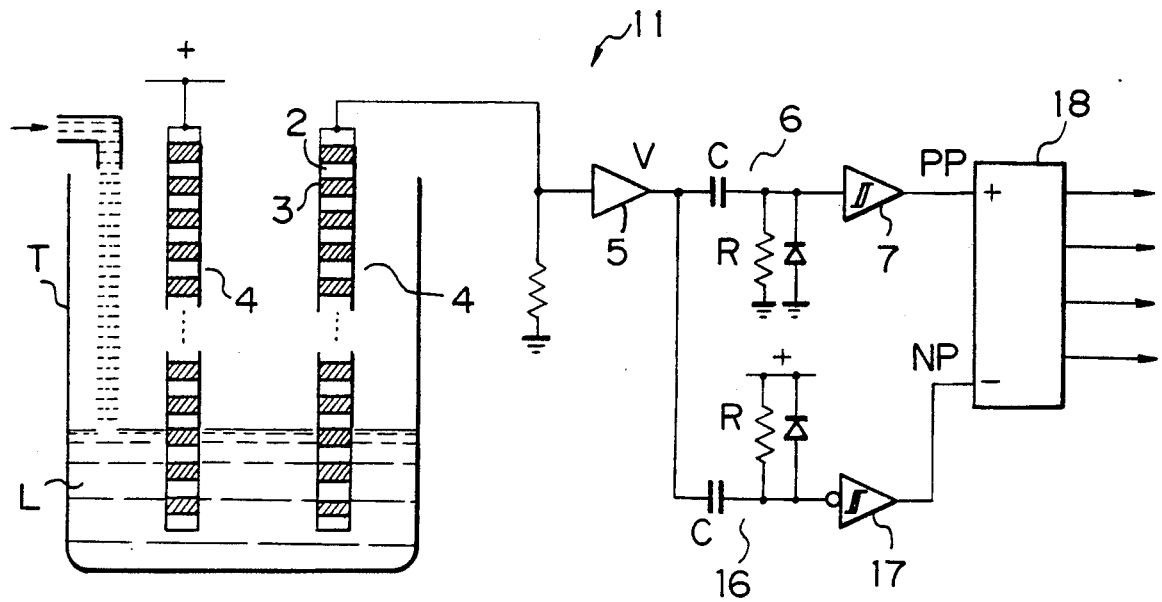
FIG. 3 is an explanatory view showing the configuration of a level sensor which is another embodiment of a device for measuring displacement according to this invention.

It is to be noted that while an approach is only employed in the above-described embodiment to monitor stepwise increases in an output voltage V of the buffer amplifier 5 an improved approach as in a level sensor 11 shown in FIG. 3 may be adopted.

Namely, a differentiating circuit 16 capable of outputting a negative differential pulse NP is used in addition to the differentiating circuit 6, and an up-down counter 18 that operates to discriminate between positive and negative differential pulses PP and NP to perform countup and countdown operations is used. Thus, since the counter 18 performs up and down operations in dependency upon increase and decrease in the output voltage V of the buffer amplifier 5, it is possible to monitor rises and falls of the level of liquid L.

In FIG. 3, reference numeral 17 denotes an inverting input type Schmitt trigger circuit connected to the output terminal of the differentiating circuit 16.

Figure 4A:
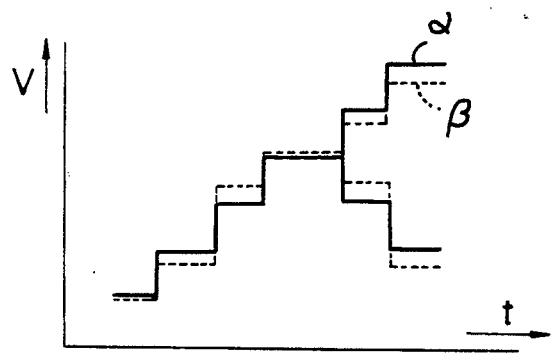
FIG. 4(a) is a charateristic diagram showing an output voltage V of the buffer amplifier shown in FIG. 3.

As shown in FIG. 4(a), it is assumed that the characteristic changes when a sensor element 4 is exchanged because of unevenness of the sensor element 4, so that output voltage V of the buffer amplifier 5 changes from α indicated by the solid line to β indicated by the dotted line.

Figure 4B:
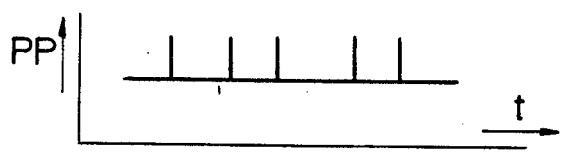
FIG. 4(b) is a characteristic diagram showing an output signal PP of the Schmitt trigger circuit shown in FIG. 3.

As shown in FIG. 4(b), since the output signal PP of the Schmitt trigger circuit 7 becomes the same signal even in the case of the characteristic α or in the case of the characteristic β, any change is not produced in a measured result obtained as an output of the up-down counter 18.

Figure 4C:
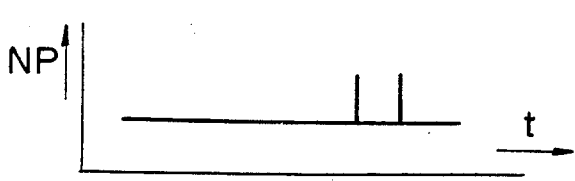
FIG. 4(c) is a characteristic diagram showing an output signal NP of the Schmitt trigger circuit shown in FIG. 3.

As shown in FIG. 4(c), since the output signal NP of the inverting input type Schmitt trigger circuit 17 becomes the same signal even in the case of the characteristic α or in the case of the characteristic β, any change is not produced in a measured result obtained as an output of the up-down counter 18.

What is claimed is:

1. A device for measuring displacement of an object, comprising:

displacement sensor means for producing an output voltage that changes stepwise in dependency upon displacement of the object;

differentiating means connected to receive said output voltage and provide output pulses at times corresponding to sudden output voltage changes; and counter means for counting said output pulses, whereby the count of said counter is a measure of said displacement.

2. A device for measuring displacement as set forth in claim 1, wherein said differentiating means is comprised of a differentiating circuit operative to output positive and negative differential pulses; and wherein said counter means is comprised of an up-down counter connected to count up and down in response to the output of positive and negative differential pulses, respectively, by said differentiating circuit.

* * * * *